United States Patent [19]

Weiss et al.

[11] Patent Number: 5,126,529
[45] Date of Patent: Jun. 30, 1992

[54] METHOD AND APPARATUS FOR FABRICATION OF THREE-DIMENSIONAL ARTICLES BY THERMAL SPRAY DEPOSITION

[76] Inventors: Lee E. Weiss, 6558 Darlington Rd.; Fritz R. Prinz, 5801 Northumberland St.; E. Levent Gursoz, 4232 Saline St., all of Pittsburgh, Pa. 15217

[21] Appl. No.: 620,745

[22] Filed: Dec. 3, 1990

[51] Int. Cl.⁵ .................. B23K 26/00; C23C 16/04; B29C 33/38; B22D 23/00
[52] U.S. Cl. ..................... 219/121.6; 118/313; 118/504; 118/720; 118/721; 164/46; 264/308; 264/317; 264/221
[58] Field of Search .......... 219/121.6, 121.67; 264/221, 255, 308, 317; 427/259, 265, 266, 282; 164/46; 118/313, 504, 505, 720, 721

[56] References Cited

U.S. PATENT DOCUMENTS

| | | | |
|---|---|---|---|
| 4,031,268 | 6/1977 | Fairbairn | 427/12 |
| 4,096,821 | 6/1978 | Greeneich et al. | 118/720 |
| 4,492,180 | 1/1985 | Martin | 118/720 |
| 4,665,492 | 5/1987 | Masters | 364/468 |
| 4,666,743 | 5/1987 | Ohta et al. | 427/265 |
| 4,752,352 | 6/1988 | Reygin | 156/630 |
| 4,753,901 | 6/1988 | Ellsworth et al. | 427/259 |
| 4,828,934 | 5/1989 | Pinkhasov | 428/622 |
| 4,929,402 | 5/1990 | Hull | 264/308 |
| 4,961,154 | 10/1990 | Pomerantz et al. | 264/255 |
| 5,059,266 | 10/1991 | Yamane et al. | 118/313 |

FOREIGN PATENT DOCUMENTS 0322257 6/1989 European Pat. Off. .
WO87/07538 12/1987 World Int. Prop. O. .
WO90/03893 4/1990 World Int. Prop. O. .

OTHER PUBLICATIONS

"Three Dimensional Printing: Ceramic Tooling and Parts Directly From A CAD Model" by Emanuel E. Sachs, Michael Cima, James Cornie, David Brancazio and Alan Curodeau submitted to the National Rapid Prototyping Conference, Dayton, Ohio, Jun. 4-5, 1990.
"Automated Fabrication of Net Shape Microcrystalline and Composite Metal Structures Without Molds" by David Fauber, pp. 461-466, published in Manufacturing Processes, Systems and Machines, 14th Conference on Production, Research and Technology, National Science Foundation, Ann Arbor, Michigan, Oct. 6-9, 1987.
"DC Arc-Plasma-The Future in The P/M Industry?" by Douglas H. Harris published by ASP-Materials, Inc., Dayton, Ohio No Publication Date.
"Polycrystalline Ferrite Films for Microwave Applications Deposited by Arc-Plasma" by D. H. Harris, J. R. Janowiecki, C. E. Semler, M. C. Willson and J. T. Cheng published in the Journal of Applied Physics, vol. 41, No. 2, 1 Mar. 1970.

Primary Examiner—Geoffrey S. Evans
Attorney, Agent, or Firm—Buchanan Ingersoll

[57] ABSTRACT

A method and apparatus for forming a three-dimensional object by thermal spraying utilizes a plurality of masks positioned and removed over a work surface in accordance with a predetermined sequence. The masks correspond to cross sections normal to a centerline through the workpiece. One set of masks defines all cross sections through the workpiece. A second set of masks contains at least one masks which corresponds to each mask of the first set. Masks from each set are alternatively placed above a work surface and sprayed with either a deposition material from which the workpiece will be made or a complementary material. In this manner, layers of material form a block of deposition material and complementary material. Then, the complementary material which serves as a support structure during forming is removed. Preferably, the complementary material has a lower melting temperature than the deposition material and is removed by heating the block. Alternatively, one could mask only for the deposition material and remove complementary material overlying the deposition material after each spraying of complementary material.

37 Claims, 3 Drawing Sheets

METHOD AND APPARATUS FOR FABRICATION OF THREE-DIMENSIONAL ARTICLES BY THERMAL SPRAY DEPOSITION

Field of Invention

The invention relates to a method and apparatus for creating a three-dimensional object by thermal spray deposition of metal, ceramic, plastic or composite material.

BACKGROUND OF THE INVENTION

Several methods have been proposed and utilized for creating three-dimensional objects by the incremental material build up of thin layers. These processes include lamination, selective laser sintering, ballistic powder metallurgy, three-dimensional printing, stereolithography and near net thermal spraying. Lamination involves the simple process of cutting layers of a selected material and then bonding those layers together. The layers may be pre-cut to shapes corresponding to a cross section through the article to be created. Alternatively, standard shapes of material can be stacked and bonded together. Then, the assembled structure is cut or machined to produce the desired shape. In U.S. Pat. No. 4,752,352, Michael Feygin proposes a computer controlled method and apparatus for forming a laminated object. He provides a supply station, a work station for forming a material into a plurality of layers for lamination, an assembly station for stacking the layers in sequence into a three-dimensional object, a station for bonding the laminations to complete the formation of the three-dimensional object and a control station. In his patent, Mr. Feygin discloses a method in which the laminations are cut from a roll of material lifted, stacked and bonded under the direction of a computerized controller. The layers are bonded together by adhesive or brazing. This and other lamination techniques have several disadvantages. First, the bond between layers is critical and limits the strength of the object. Second, creation of each layer of the laminate also results in the production of significant amounts of waste materials. Third, the resulting object has a layered or serrated edge which must be removed by sanding or grinding. Finally, lamination is suitable for only those materials which can be formed into thin layers which can be bonded together.

In laser sintering, a laser is used to cure a starting material into a certain configuration according to the manner in which the laser is applied to that material. Stereolithography is a more recent yet similar process which creates plastic prototype models directly from a vat of liquid photocurable polymer by selectively solidifying it with a scanning laser beam. An example of this method is described in European Patent 322 257. Both of these methods require a substantial amount of curable raw material. In both cases the laser must be carefully controlled to achieve the desired shape. In some applications, the laser typically does not fully cure each cross section. Rather, the laser cures the boundary of a section and then cures an internal structure or honeycomb that traps the uncured fluid. Thereafter, the article must be subjected to final curing under separate ultraviolet lights or heat treatment. Additional post processing, such as careful sanding and grinding, is required for making smooth, accurate surfaces.

In ballistic powder metallurgy beams of particles are directed to the coordinates of a three-dimensional object in a three-dimensional coordinate system. A physical origination seed to which the particulate matter is attracted is required. The process may use a beam of particles directed to the origination seed which builds the particles upward from that seed. Alternatively, one can use an energy beam which attracts the particulate matter already in the environment to the seed or Masters in U.S. Pat. No. 4,665,492. This method cannot be used to make objects having undercuts therein without creating support structures at the same time. Normally, the support structures are created with the particle beam during the creation of the object. Such support structures must be removed by cutting, grinding or machining.

Three-dimensional printing is another technique similar to ballistic powder metallurgy. One variation of this technique creates layers of particles to produce a three-dimensional image in much the same manner that an ink jet printer produces two-dimensional images. The technique relies upon thermal shock or drop on demand material delivery techniques. A thermal shock technique forms a particle by vaporizing a small area of the fluid directly behind the nozzle. The drop on demand nozzle includes a piezo electric element to constrict the cavity thereby forcing a drop past the nozzle plate. In both instances the material is directed to a work surface in a manner to build up the article. This technique can only be used for certain kinds of materials.

In another variation of three-dimensional printing a series of two-dimensional layers are created by adding a layer of powder on top of a work surface. The powdered layer is selectively joined where the part is be formed by ink jet printing of a binder material. The work surface is then lowered and another layer of powder is spread out and selectively joined. The layering process is repeated until the part is completely printed. Following a heat treatment the unbonded powder is removed leaving the fabricated part. Although this technique has been proposed for metal, ceramic and plastic materials, it is limited to those materials to which a reliable binder can be applied.

None of the just described fabrication techniques have been successfully used to make steel parts. Of the previously described processes only laser sintering and ballistic powder metallurgy have been proposed for steel part fabrication. However, objects made from laser sintering are porous. Such porosity is not acceptable for most steel parts. Ballistic powder metallurgy utilizes a particle beam which is difficult to control to acceptable levels of accuracy.

The art has attempted to make objects by spraying layers of metal on a substrate. Problems have occurred in that the layers have tended to camber and possibly to peel apart from the substrate. Therefore, one must have a release agent or compatible substrate.

There is a need for a method and apparatus to manufacture quality metal parts by incremental build-up of material. The method and apparatus should be capable of producing articles having undercuts and irregular shapes.

BRIEF DESCRIPTION OF THE INVENTION

We provide a method and apparatus to manufacture a three-dimensional object by incremental material build up of thin layers. Each layer is composed of two portions. A first portion shape represents a cross sectional slice of the three dimensional object being built and is composed of the desired deposition material. The second portion is the complement of the object shape of the first portion and serves as a structure which supports the growing object form and as a self-anchoring substrate. Both portions are applied by thermal deposition spray by preferably using two thermal deposition guns. One gun sprays the primary material over a mask selected from a first set of masks. The second gun sprays the support material over a mask selected from a second set of masks. The first set of masks contains at least one mask corresponding to each cross section through an article such that there is at least one mask in every set for every parallel cross section normal to a center line through the article. The second set of masks contains at least one mask corresponding to each mask from the first set of masks and defines a complement to the cross section defined by that corresponding mask. The masks are alternately placed on a work surface, sprayed with either the deposition material or a complementary material and removed. The masks are placed, sprayed and removed in accordance with a predetermined sequence so that a layered structure is built up which contains the object made of the deposition material surrounded by the complementary material. The complementary material is then removed leaving the created object. We prefer to use a complementary material having a lower melting point than the deposition material. Therefore, the complementary material can easily be removed by heating. We further prefer to spray both materials according to a predetermined spray pattern to assure uniform distribution of the materials through each layer.

We prefer to produce masks in a manner to avoid any island feature in the masks. To do this we define at least two masks for each cross section of the object or support material. We further prefer to position these masks so that any seams in the sprayed deposition material do not align, but crisscross.

Other objects and advantages of the invention will become apparent in connection with the description of the preferred embodiments shown in the following figures in which comparable parts carry the same reference numerals.

DESCRIPTION OF THE PREFERRED EMBODIMENTS

Figure 1:
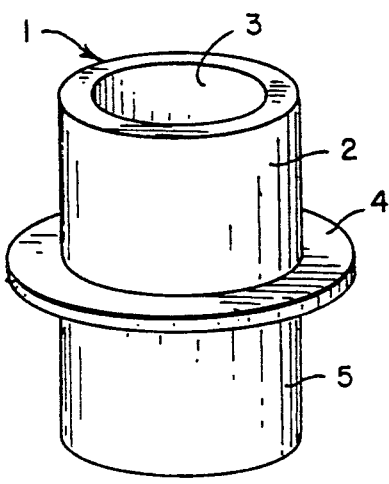
FIG. 1 is a perspective view of an article to be created.
Figure 4:
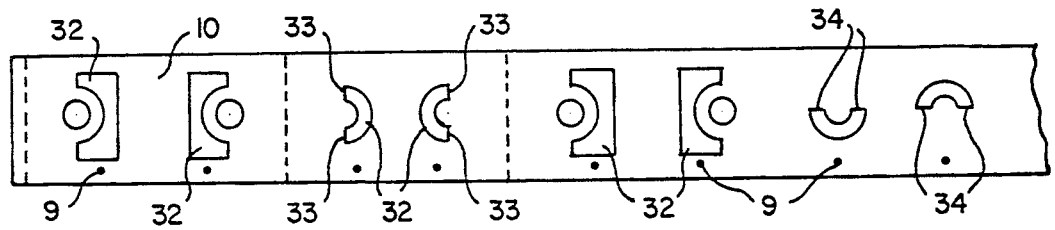
FIG. 4 is a top plan of a strip of mask material in which different masks have been cut to make the article of Figure 1.
Figure 6:
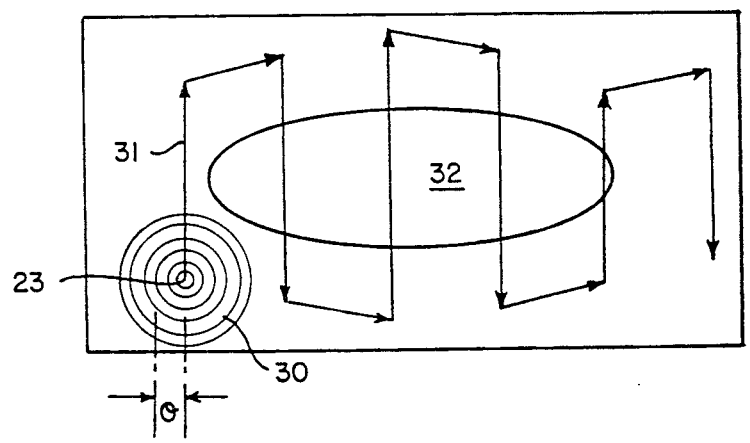
FIG. 6 is a diagram showing a thermal spray pattern using a single spray gun for practicing our method.

In FIG. 1 we show an article 1 which can be manufactured in accordance with our method and apparatus. This article is comprised of a upper tubular portion 2 and lower tubular portion 5 separated by collar 4. The article is hollow as indicated by passageway 3. To make the object of FIG. 1 we use the device diagramed in FIG. 2. There we provide a masking material 10 in roll form on roller 11 which passes through the apparatus to take-up roll 12. At station 13 wax or an adhesive material can be applied to the under surface of the masking material or one could use pressure sensitive paper. This material may be a metal foil, paper, reinforced paper or other suitable material. We have found that paper can be used as a masking material for making an object of stainless steel utilizing a low melting point alloy as the complementary material. As the masking material passes under laser 14 a mask is cut by the laser. The cut away portion 15 of the masking material 10 drops from the moving mask material onto a surface 17 for disposal. The masking material continues to a position over a work table 16 where it stops. The work table preferably is capable of moving in three directions as indicated by arrows x, y and z. When the mask material reaches a desired position above table 16, head 20 is moved in a manner to direct the delivery of a base material such as steel from gun 24 or a complementary material ("C. MATL.") such as Cerro metal from spray gun 22. One preferred pattern of motion is shown in FIG. 6. A sequence of masks, some of which are shown in FIG. 4, are moved over the table. Layers 7 of deposition material and complementary material are deposited on the work table. After each layer is completed, work table 16 is dropped to allow for deposition of the next layer. Although we prefer to move the spray guns during deposition, one could also use a fixed spray gun and move the work surface 16.

The art has observed in some metal spray processes that residual stress develops in the sprayed metal layer causing the layer to camber and possibly to peel. To relieve the stress the art has shot peened such layers. The technique is only successful in situations where shot is evenly applied over the layer. Since our layers are flat, we can use this technique. Therefore, we prefer to provide a shot penner 25 for shot peening each layer.

It is also possible to relieve the stress by induction heating. Therefore, we alternatively provide an induction heater 27 which we move over each layer to selectively heat the surface. Such heating is easier to accomplish on flat layers rather than on curved and irregular surfaces.

Figure 3:
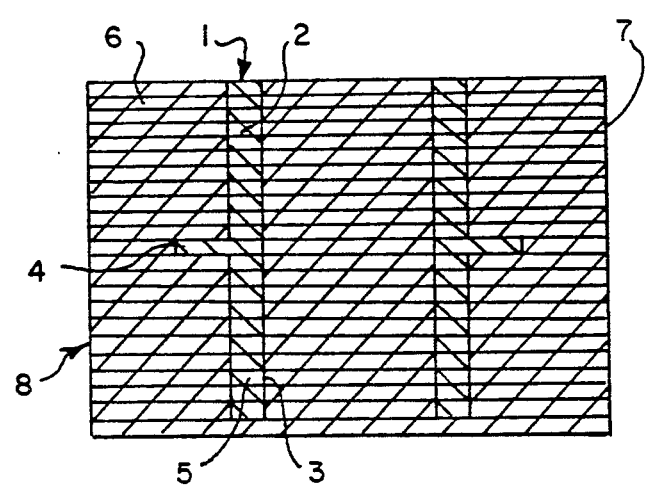
FIG. 3 is a cross sectional view of the block of sprayed material for making the article shown in FIG. 1.

Upon completion of the process, one will have a block of material 8, a cross section of which is shown in FIG. 3. Because we have deposited a complementary material 6 with the deposition material, we are able to create intricate shapes and parts having undercut portions. For the particular object of FIG. 1, the complementary material 6 supports the deposited collar material 4. We prefer that the complementary material have a melting point lower than the melting point of the material used to form the object. If that occurs the block 8 of material shown in FIG. 3 can be heated to a temperature so that complementary material 6 can be heated and melted away from the object 1. We have found that if the article is to be fabricated in steel or zinc a metal alloy or polymer having a melting temperature between approximately 150° to 340° F. makes a suitable complementary material. Such alloys are manufactured by Cerro Metal Products Company of Belafonte, Pa., and sold under the trademark of Cerro.

Although the masks used for our technique could be produced separately, we prefer to use a single apparatus for producing the masks and spraying the layers. Consequently, in the embodiments shown in the drawings, a roll of masking material 10 is fed out to a cutting unit such as a laser-based pattern cutter 14. Fiducial markers 9 may also be cut out to provide for precise alignment of the mask 10 over the substrate. The substrate is seated on a set of servo controlled x-y-z (and perhaps rotary) stages. The x-y stages may be integrated with an optical sensing system, which detects the fiducial markers, to precisely align the mask over the substrate. The z-stage drops the substrate by the thickness of each layer, between consecutive layers. The masking material may be a paper, a plastic, or a metal. If a metal or plastic is used, then the thermal spray may cause sections of the mask to move around under the spray turbulence. Therefore, a "sticky" surface may have to be applied to the backside of the roll, for example with a waxer 13, to hold the mask in place against the substrate. Alternatively, one could use pressure sensitive paper for the masks.

Since each layer is comprised of two materials, at least one mask per layer may require an "island" feature (i.e., a region unconnected to the main roll), which is physically not realizable. For example, if a steel cross-section is a circle, then the support structure mask would require a frame with a circular island. To handle this situation, two masks, and thus two spray sequences, are required to form "island" features (FIG. 4). Thus, if a particular layer of the main shape has holes in it, then at least four masks 32 are required; two to form the support structure material (e.g. Cerro metal) and two to form the main material (e.g. steel).

With the aforementioned approach there may be seams in the spray deposition between boundaries of contiguous sections formed with two masks. This may be deleterious to the over-all part strength and its fatigue characteristics. To minimize this problem, the masking operations should be planned so that the seams between consecutive layers do not align but criss-cross. For example, FIG. 4 shows the masks for two layers of a cylinder. Here corresponding edges 33 and 34 for two mask pairs are positioned so that edges 33 are at right angles 34.

Figure 5:
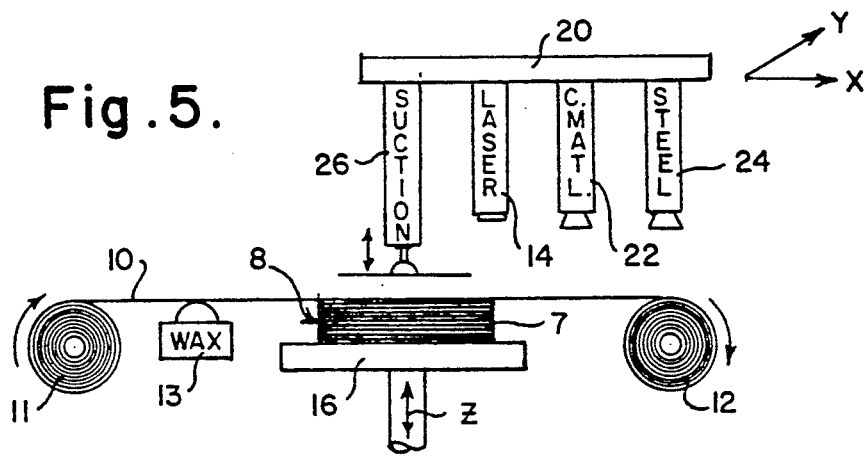
FIG. 5 is a diagram of a second preferred embodiment of our apparatus.

An alternative apparatus for making the article of FIG. 1 is shown in FIG. 5. This embodiment avoids the problem produced by "island" features by first advancing the uncut mask material 10 over the substrate comprised of a block of deposited material 8 or work surface 16 and then cutting the mask directly on the substrate 8. The depth of penetration of the laser cutting action would have to be carefully controlled so as not to distort the substrate 8. The backside of the mask material 10 would have be "sticky" so that "islands" adhere to the substrate 8. In this embodiment, additional mechanisms such as suction devices 26 or grippers (not shown) would be required to remove the cut-out portions 15 of the masks 10 before spraying proceeds and to remove portions of the mask, which are not connected to the roll, after each section is sprayed. We provide the same mask material 10 traveling from supply wheel 11 to take up wheel 12. Once again wax or adhesive is applied to the underside of the mask material. Layers 7 of the deposition material from which the article is made along with the complementary material are deposited on work table 16. In this arrangement, however, the mounting head 20 contains not only the deposition spray guns 22 and 24, but also laser 14 which is used to cut the mask material. In the apparatus of FIG. 5 the mask material 10 is fed over work table 16. Mounting head 20 is moved so that laser 14 is positioned above the mounting table 16. The mounting head then moves to direct the laser to cut away a portion of the mask material corresponding to the cross sectional area to be sprayed. Then mounting head 20 is moved so that the cut away mask material attached to suction 26 can be discarded. Then, the mounting head moves the appropriate spray head 22 or 24 over the mask material so that either the deposition material or the complementary material can be sprayed over the mask 10 onto the work table. Additionally, appropriate mechanisms (not shown) would be required to move the laser cutter 16 and the spray sources 22 and 24 in and out of the common workplace. However, a precision x-y alignment source under the substrate would not be required with this second approach. This process continues in sequence until all of the various layers 7 have been deposited to make the work piece. Thereafter, the block of deposited material 8 is handled in the same manner as occurred with the apparatus of FIG. 2. With this embodiment an island feature can be cut in a single mask since the mask can be removed by suction or grippers.

Figure 2:
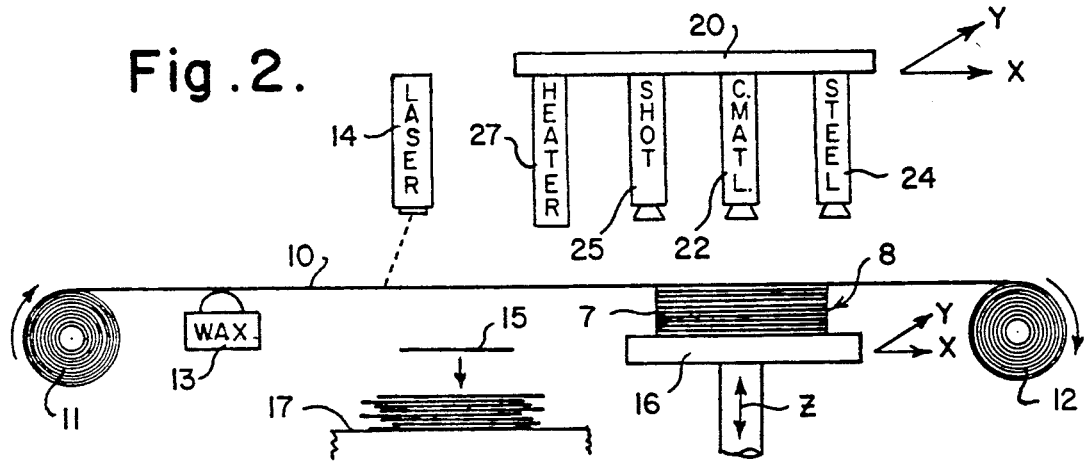
FIG. 2 is a diagram showing a present preferred embodiment of our apparatus for making three-dimensional objects such as the article shown in FIG. 1.

In the embodiments of FIGS. 2 and 4 we show the spray heads 22, 24 and 25 on a single mounting head 20. It should be understood that separate mounting heads could be provided for each spray head or for selected combinations of spray heads.

For each layer, one series of masks is required to define the shape of the primary deposition material (e.g. steel), and another series of masks is required to define the support structure shape. The spray deposition must be uniform within the bounds of the masks to achieve a uniform deposition thickness.

Figure 7:
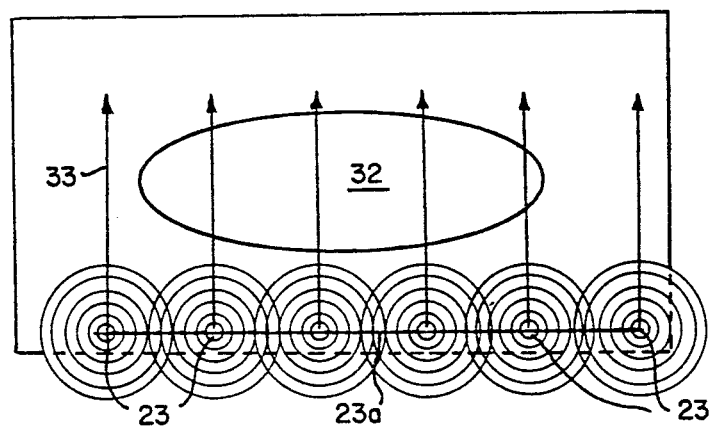
FIG. 7 is a diagram showing a multiple spray pattern using multiple spray sources.

Conventional thermal spray sources typically produce Gaussian distributions. One method of producing a uniform distribution is to use a multiplicity of appropriately spaced Gaussian distribution spray patterns. The summation of identical Gaussian distributions which are spaced apart by 1.5 standard deviations produces an approximately uniform distribution in the plane passing through line 23a in FIG. 7 running between the center axis of the first Gaussian source and the center axis of the last Gaussian source. An approximately uniform distribution will also occur in and all planes of similar length parallel to the plane passing through line 23a. This uniform distribution will occur independent of the number of sources. Thus, a uniform distribution may be achieved by spraying multiple passes with a single source as shown in FIG. 6. Here a spray head 23 produces a spray pattern indicated by concentric circles 30. The pattern has a standard deviation $\sigma$. The spray head is moved along path 31. All passes must be parallel and spaced by 1.5 standard deviations $\sigma$. The bounds of the source spray must extend beyond the mask shapes 32 onto the mask material 10. Alternatively a uniform distribution can be achieved using a set of sources 23 shown in FIG. 7 and spraying in a single pass, indicated by arrows 33. There are enough sources 23 to cover the limits of the largest mask boundaries. The multiple source method would produce faster cycles times and may be more precise relative to the single source method.

Figure 9:
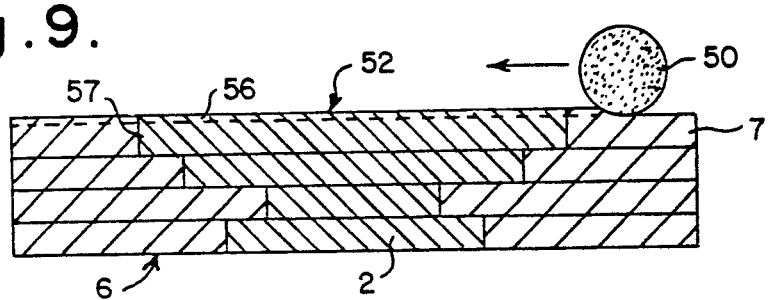
FIG. 9 is a sectional view of the block produced with the apparatus of FIG. 9 being ground.
Figure 8:
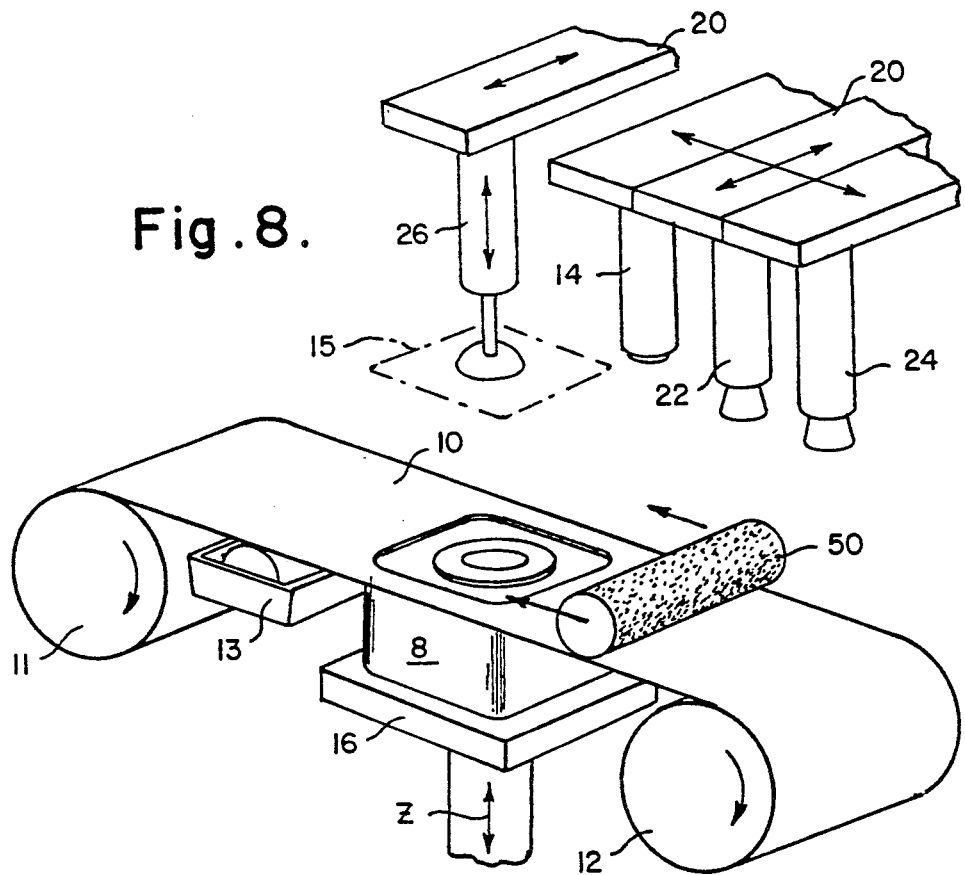
FIG. 8 is a diagram of yet a third preferred embodiment of our apparatus.

The mask production/spray methods so far disclosed require extremely tight control of the spray deposition to assure that a uniform, constant and repeatable thickness of material be deposited for each layer. Also, the complementary support/ primary material masks for each layer, must be accurately registered to assure a perfect boundary between the deposited support and primary materials. An alternative embodiment shown in FIGS. 8 and 9 alleviates these problems by incorporating a milling or grinding tool 50 to "face" each layer 7 to the exact thickness after each layer is deposited. With this approach, only a primary material mask (e.g. for steel) is required. First the mask for the primary material 2 (e.g. steel) is cut by any of the previously disclosed means. The steel layer 6 is sprayed. The mask is then removed. Cerro metal 6 is sprayed directly over that entire layer, without using a Cerro metal mask, filling in the region adjacent to the just sprayed steel as well as covering the top 52 of the steel. A milling head or a grinding wheel 50 (or a combination of these) then passes over that layer removing the Cerro metal 56 which covers the steel and trimming that layer 57 to the exact thickness. The resulting milled surface should be sufficiently rough to assure bonding of the next layer to be deposited thereon. The process is then repeated for each layer until the final block of material is produced. Then the Cerro metal 6 is removed and the article is polished or otherwise processed as required. In some applications it may be desirable to mill the steel before applying the Cerro metal and then mill the entire layer after Cerro metal is deposited. If this procedure is used we would expect to use a coarser mill head on the steel layer alone.

Figure 10:
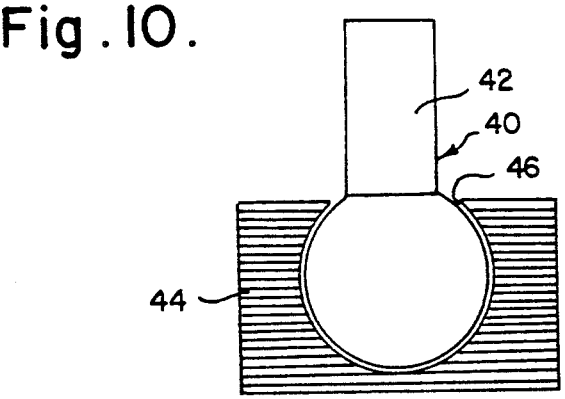
FIG. 10 is a cross section of a ball joint which can be made in accordance with the present invention.

The solid-freeform fabrication system disclosed here would also permit the fabrication of complete functional assemblies containing two or more mating parts in one process without the requirement of discrete assembly operations. In FIG. 10 we show a ball joint 40 having a ball head 42 in a socket 44 separated by space 46. This part can be made such that ball head 42 is one material and socket 44 is a second material. During fabrication a complementary material is deposited to fill space 46 and surround head 42 and socket 44. For example, the socket 44 may be steel, the ball head 44 a composite, and the complementary material can be Cerro metal. Upon completion of the spraying, the workpiece is heated to melt away the Cerro metal, leaving the assembly shown in FIG. 10.

While we have described certain preferred embodiments of our apparatus and method, it should be distinctly understood that our invention is not limited there, but may be variously embodied with the scope of the following claims.

We claim:
1. A method for the fabrication of a three dimensional article comprising the steps of
  a) creating a first set of masks, each mask corresponding to at least a portion of a cross section through the article such that there is at least one mask in the first set for every parallel cross section through the article normal to a centerline through the article;
  b) creating a second set of masks, each mask corresponding to at least one mask from the first set of masks and defining a complement to the cross section defined by a corresponding mask from the first set of masks;
  c) alternatively placing on a work surface at least one mask from the first set and then at least one mask from the second set in accordance with a predetermined sequence;
  d) spraying deposition material over each mask from the first set of masks and one of the work surface and deposition material on the work surface;
  e) removing the mask after spraying the deposition material;
  f) spraying a complementary material over each mask from the second set of masks and one of the work surface and complementary material on the work surface;
  g) removing the mask after spraying the complementary material; and
  h) removing the complementary material from the sprayed deposition material.

2. The method of claim 1 wherein the complementary material has a melting point below a melting point of the deposition material.

3. The method of claim 2 wherein the complementary material is metal alloy having a melting temperature between approximately 150° to 340° F. and the deposition material is a steel.

4. The method of claim 1 wherein the deposition material is one of a metal, a ceramic, a plastic and a composite thereof.

5. The method of claim 1 wherein the masks are one of foil, plastic, paper and pressure sensitive paper.

6. The method of claim 1 where pa of masks from the first set of masks define at least some of the cross sections through the article with each pair of masks defining a single cross section.

7. The method of claim 6 wherein the masks in each pair of masks have a corresponding edge and the pairs of masks are placed in a manner so that the corresponding edges for each pair of masks will not be placed along the same line as the corresponding edges of the next pair of masks.

8. The method of claim 1 wherein the masks are cut from a continuous roll of mask material.

9. The method of claim 8 also comprising the step of removing portions cut away from the mask material with a suction device.

10. The method of claim 1 wherein at least two different materials are also used for the deposition material.

11. The method of claim 1 also comprising the step of applying a sticky material to at least some of the masks prior to placing the masks.

12. The method of claim 1 wherein at least one of the deposition material and the complementary material are applied with a spray source that is moved over the work surface according to a predetermined path.

13. The method of claim 12 wherein the spray source produces a thermal spray pattern having a Gaussian distribution having a standard deviation and the path is such that passes of the spray gun are spaced apart by 1.5 standard deviations.

14. The method of claim 1 wherein at least one of the deposition material and the complementary material are applied through a plurality of spaced apart thermal spray sources.

15. The method of claim 14 wherein the thermal spray sources produce thermal spray patterns having a Gaussian distribution having a standard deviation wherein the spray sources are positioned and moved in parallel paths separated by 1.5 standard distributions.

16. The method of claim 1 also comprising the step of shot peening at least a portion of the sprayed deposition material.

17. The method of claim 1 also comprising the step of heating at least a portion of the sprayed deposition material.

18. A method for fabrication of a three-dimensional article comprising the steps of:
   a) creating a first set of masks, each mask corresponding to at least a portion of a cross section through the article such that there is at least one mask in the first set for every parallel cross section through the article normal to a centerline through the article;
   b) placing at least one mask over a work surface;
   c) spraying a deposition material over the work surface and mask placed thereover;
   d) removing the at least one mask;
   e) spraying a complementary material over the work surface and deposition material sprayed thereon to form a layer of deposition material and complementary material;
   f) machining the layer to a selected thickness thereby removing all complementary material from an exposed top surface of the deposition material;
   g) repeating steps b thru f as necessary to build up the article; and
   h) removing the complementary material from the deposition material.

19. The method of claim 18 wherein the complementary material has a melting point below a melting point of the deposition material.

20. The method of claim 19 wherein the complementary material is metal alloy having a melting temperature between approximately 150° to 340° F. and the deposition material is a steel.

21. The method of claim 18 wherein the deposition material is one of a metal, a ceramic, a plastic and a composite thereof.

22. The method of claim 18 wherein the masks are one of foil, plastic, paper and pressure sensitive paper.

23. The method of claim 18 wherein the masks are created over the work surface.

24. An apparatus for forming an integral three-dimensional article by thermally spraying layers of material comprising:
   a) a work surface;
   b) means for supplying to the work surface masks corresponding to cross sections through the article;
   c) means for placing the masks over the work surface and removing them therefrom in accordance with a predetermined sequence;
   d) means for thermally spraying a deposition material over the masks, the work surface, and material deposited on a work surface, and
   e) means for thermally spraying a complementary material over the masks, the work surface and material deposited on the mask surface.

25. The apparatus of claim 24 wherein the masks are in roll form and the means for supplying the masks is comprised of a supply spool and a take-up spool between which the masks pass.

26. The apparatus of claim 25 also comprising means for forming masks connected to the means for supplying masks.

27. The apparatus of claim 26 wherein the means for forming the masks is a laser cutter.

28. The apparatus of claim 24 also comprising a head positioned above the work surface to which are attached the means for thermally spraying a deposition material and the means for thermally spraying a complementary material.

29. The apparatus of claim 28 also comprising means for forming masks mounted on the head.

30. The apparatus of claim 24 wherein a single spray nozzle is used as the means for thermally spraying a deposition material and the means for thermally spraying a complementary material.

31. The apparatus of claim 24 also comprising means for applying a sticky material to at least some of the masks positioned near the means for placing the masks.

32. The apparatus of claim 24 wherein the work surface is movable in x, y and z planes.

33. The apparatus of claim 24 wherein the means for placing the masks and removing the masks includes a suction device.

34. The apparatus of claim 24 also comprising a shot peener positioned above the work surface for shot peening deposition material on the work surface.

35. The apparatus of claim 24 also comprising means for removing deposition material and complementary material to create layers of substantially uniform thickness.

36. The apparatus of claim 35 wherein the means for removing deposition material and complementary material is at least one grinding wheel.

37. The apparatus of claim 24 also comprising a heater positioned above the work surface for heating at least a portion of the deposition material on the work surface.

* * * * *

UNITED STATES PATENT AND TRADEMARK OFFICE
CERTIFICATE OF CORRECTION

PATENT NO. : 5,126,529

DATED : June 30, 1992

INVENTOR(S) : LEE E. WEISS, FRITZ B. PRINZ, E. LEVENT GURSOZ

It is certified that error appears in the above-identified patent and that said Letters Patent is hereby corrected as shown below:

On the Title page:

At [76] Inventors, change "Fritz R. Prinz" to --Fritz B. Prinz--.

At [56] References Cited, change "Reygin" to --Feygin--.

Column 2, line 7, after "or" insert --another coordinate. Such a system is disclosed by William E.--

Column 7, line 44, change the second occurrence of "44" to --42--.

Column 8, line 28, claim 6, change "where pa" to --wherein pairs--.

Signed and Sealed this

Sixteenth Day of March, 1993

*Attest:*

STEPHEN G. KUNIN

*Attesting Officer*      *Acting Commissioner of Patents and Trademarks*